US010450879B2

(12) United States Patent
Di Mare et al.

(10) Patent No.: US 10,450,879 B2
(45) Date of Patent: Oct. 22, 2019

(54) GAS TURBINE ENGINE

(71) Applicant: ROLLS-ROYCE plc, London (GB)

(72) Inventors: Luca Di Mare, London (GB); Fernando Barbarossa, London (GB); Max E. Rife, London (GB)

(73) Assignee: ROLLS-ROYCE plc, London (GB)

( * ) Notice: Subject to any disclaimer, the term of this patent is extended or adjusted under 35 U.S.C. 154(b) by 169 days.

(21) Appl. No.: 15/341,941

(22) Filed: Nov. 2, 2016

(65) Prior Publication Data

US 2017/0145840 A1 May 25, 2017

(30) Foreign Application Priority Data

Nov. 23, 2015 (GB) .................................. 1520623.8

(51) Int. Cl.
*F01D 9/04* (2006.01)
*F01D 5/14* (2006.01)

(52) U.S. Cl.
CPC ............. *F01D 9/041* (2013.01); *F01D 5/148* (2013.01); *F05D 2220/32* (2013.01); *F05D 2250/38* (2013.01); *F05D 2260/961* (2013.01); *Y02T 50/673* (2013.01)

(58) Field of Classification Search
CPC ...... F01D 9/041; F01D 5/148; F05D 2250/38; F05D 2260/961; F05D 2220/32; Y02T 50/673
See application file for complete search history.

(56) References Cited

U.S. PATENT DOCUMENTS

| 3,617,147 | A | | 11/1971 | Bragg | |
|---|---|---|---|---|---|
| 4,726,737 | A | * | 2/1988 | Weingold | B64C 11/18 416/223 A |
| 5,642,985 | A | * | 7/1997 | Spear | F01D 5/141 415/181 |
| 5,779,443 | A | * | 7/1998 | Haller | F01D 5/141 415/191 |
| 5,906,474 | A | * | 5/1999 | Haller | F01D 5/141 415/191 |
| 6,022,188 | A | * | 2/2000 | Bancalari | F01D 5/141 415/115 |

(Continued)

FOREIGN PATENT DOCUMENTS

| EP | 2 522 809 A2 | 11/2012 |
|---|---|---|
| GB | 2 401 654 A | 11/2004 |

(Continued)

OTHER PUBLICATIONS

Mar. 8, 2016 Search Report issued in British Patent Application No. 1520623.8.

(Continued)

*Primary Examiner* — Jason D Shanske
*Assistant Examiner* — Hakeem M Abdellaoui
(74) *Attorney, Agent, or Firm* — Oliff Plc

(57) ABSTRACT

A gas turbine engine includes a circumferential row of vanes directly upstream of an asymmetric gas flow path. At a given spanwise position, a tangential and axial position of the outer guide vanes varies along the circumferential row of vanes. One or more of the vanes are leant such that the tangential and axial position of one or more vanes of the circumferential row of vanes varies in a spanwise direction.

13 Claims, 7 Drawing Sheets

(56) References Cited

U.S. PATENT DOCUMENTS

| | | | |
|---|---|---|---|
| 6,709,233 B2* | 3/2004 | Haller | F01D 5/141 415/192 |
| 6,899,526 B2* | 5/2005 | Doloresco | F01D 5/141 416/223 A |
| 7,118,331 B2* | 10/2006 | Shahpar | F01D 5/141 415/195 |
| 7,175,393 B2* | 2/2007 | Chandraker | F01D 5/141 416/223 A |
| 7,234,914 B2* | 6/2007 | Usab, Jr. | F01D 5/142 415/1 |
| 7,444,802 B2* | 11/2008 | Parry | F01D 5/10 415/160 |
| 7,794,202 B2* | 9/2010 | Borthwick | F01D 5/141 415/191 |
| 8,425,185 B2* | 4/2013 | Myoren | F01D 5/141 415/192 |
| 8,540,490 B2* | 9/2013 | Ramakrishnan | F01D 5/146 416/1 |
| 8,702,398 B2* | 4/2014 | Breeze-Stringfellow | F01D 5/141 416/242 |
| 8,894,376 B2* | 11/2014 | Penny | F01D 5/141 416/228 |
| 9,017,036 B2* | 4/2015 | Straccia | F01D 5/141 416/242 |
| 9,650,896 B2* | 5/2017 | Pesteil | F01D 5/141 |
| 9,765,626 B2* | 9/2017 | Neubrand | F01D 5/141 |
| 10,202,865 B2* | 2/2019 | Breeze-Stringfellow | F02K 1/46 |
| 2003/0031564 A1* | 2/2003 | Kawarada | F01D 5/141 416/235 |
| 2004/0234372 A1* | 11/2004 | Shahpar | F01D 5/142 415/149.1 |
| 2004/0265124 A1 | 12/2004 | Liu et al. | |
| 2008/0181769 A1* | 7/2008 | Wilson | F01D 5/141 415/181 |
| 2009/0013532 A1* | 1/2009 | Wood | F01D 5/141 29/889.7 |
| 2009/0317237 A1 | 12/2009 | Wood et al. | |
| 2012/0183411 A1* | 7/2012 | Haller | F01D 9/041 416/243 |
| 2012/0328432 A1 | 12/2012 | Ramakrishnan et al. | |
| 2015/0260051 A1* | 9/2015 | Gallagher | F02K 3/06 415/144 |
| 2016/0010487 A1* | 1/2016 | Breeze-Stringfellow | F01D 17/16 415/148 |
| 2016/0063139 A1* | 3/2016 | Cellier | F01D 5/14 703/1 |
| 2016/0238481 A1 | 8/2016 | Brandon et al. | |

FOREIGN PATENT DOCUMENTS

| | | |
|---|---|---|
| GB | 2 435 309 A | 8/2007 |
| GB | 2475140 A | 5/2011 |
| WO | WO-2009103528 A3 * | 10/2009 ............. F01D 5/141 |

OTHER PUBLICATIONS

May 19, 2016 Search Report issued in British Patent Application No. 1520621.2.
U.S. Appl. No. 15/341,970, filed Nov. 2, 2016 in the name of Luca Di Mare et al.
Nov. 15, 2018 Office Action issued in U.S. Appl. No. 15/341,970.
Shahpar, S. "A Review of Automatic Optimisation . . . " Design Optimization Intrntl Conf: Athens, Greece [retrieved on Nov. 7, 2018]. Retrieved from <https://www.researchgate.net/publication/267956392_A_Review_oCAutomatic_Optimisation_Applications_in_Aerodynamic_Design_of_Turbomachinery_Components> (Year: 2004).
Shahpar. S. "Towards Robust CFD Based Design Optimisation of Virtual Engine" RTO-MP-AVT-147 (Athens, Greece) [retrieved on Nov. 7, 2018]. Retrieved from <https://www.researchgate.net/publication/267568994_Towards_Robust_CFD_Based_Design_Optimisation_of_Virtual_Engine_NATO unclassified_paper> (Year: 2007).
Schulten, J. "Frequency-Domain Method for the Computation of Propeller Acoustics" AIAA Journal, vol. 26, No. 9, pp. 1027-1035 [retrieved on Nov. 8, 2018]. Retrieved from <https://arc.aiaa.org/doi/pdf/10.2514/3.10008> (Year: 1988).
Arias, S. "Automatic CFD Analysis Method for Shape Optimization" (Graduation project) Mechanical Engineering Department, Eafit University [retrieved on Nov. 7, 2018]. Retrieved from <https://repository.eafit.edu.co/bitstream/handle/10784/5048/ Santiago_GiraldoArias_2007.pdf> (Year: 2007).
Shahpar, et al. "Multi-Objective Design and Optimisation of Bypass Outlet-Guide Vanes" GT2003-38700, Proceedings of IGTI (Atlanta, Georgia); doi: 10.1115/GT2003-38700 [retrieved on Nov. 7, 2018]. Retrieved from <http://proceedings .asmedigitalcollection .asme .org/proceeding .aspx?articleid = 1578329> (Year: 2003).
Clemen, C. "Aero-mechanical optimisation of structural fan outlet guide vanes" Structural and Multidisciplinary Optimization, vol. 44, Issue 1, pp. 125-136 [retrieved on Nov. 8, 2018]. Retrieved from <https:!/link.springer.com/article/10.1007/s00158-010-0617-4> (Year: 2011).
Endicott et al. "Aerodynamic Improvement of a Transonic Fan Outlet Guide Vane Using 3D Design Optimization" GT2011-46363, ASME 2011 Turbo Expo, pp. 1395-1404; doi: 10.1115/GT2011-46363 [retrieved on Nov. 8, 2018]. Retrieved from STIC. (Year: 2011).
Giacche, et al. "Optimization of Bypass Outlet Guide Vane for Low Interaction Noise" AIAA Journal, vol. 52, No. 6, pp. 1145-1158; doi.org/10.2514/1.J052003 [retrieved on Nov. 8, 2018]. Retrieved from STIC. (Year: 2014).
Sonoda et al. "A Novel Transonic Fan Swept Outlet Guide Vane Using 3D Design Optimization" GT2014-25857,ASME Turbo Expo 2014; Dusseldorf, Germany, pp. V02AT37A022; doi: 10.1115/GT2014-25857 [retrieved on Nov. 8, 2018]. Retrieved from STIC (Year: 2014).
Parry, A. "Optimisation of Bypass Fan Outlet Guide Vanes" 96-GT-433, ASME 1996 International Gas Turbine and Aeroengine Congress; doi: 10.1115/96-GT-433 [retrieved on Nov. 7, 2018]. Retrieved from <https://proceedings. asmedigitalcollection.asme.org/proceeding. aspx?articlelD=2110237> (Year: 1996).

* cited by examiner

GAS TURBINE ENGINE

TECHNICAL FIELD

The present disclosure concerns a gas turbine engine and/or a method of manufacturing a gas turbine engine.

BACKGROUND

A typical gas turbine for aircraft propulsion comprises an axial fan driven by an engine core. The engine core is generally made up of one or more turbines which drive respective compressors via coaxial shafts. The fan is usually driven by an additional lower pressure turbine in the engine core. The flow handled by the fan provides a major contribution to the thrust of the engine and is discharged through a row of outlet guide vanes (OGV) and through a bypass duct, which surrounds the rear part of the engine.

The bypass duct is split into crescent shaped portions downstream of the OGV by one or more pylons (which may also be referred to as bifurcations). The pylons are needed to host structures connecting the engine to the airframe as well as connecting lines for electrical power, fuel, oil and service air, or mechanical elements driving auxiliary machinery located on the fan case and driven by a core-mounted gear box.

The presence of the pylons means that downstream of the OGVs the bypass duct is asymmetric. The fan rotates past a non-uniform flow field as a result of the asymmetry of the bypass duct and as a result of the asymmetry of the intake duct. Under certain conditions the magnitude and pattern of the flow non-uniformity in proximity of the fan may be sufficient to reduce the fan operating range and to give rise to high levels of forcing on the fan blades. This phenomenon is undesirable and provisions are needed to reduce flow non-uniformity experienced by the fan.

One method of improving flow uniformity experienced by the fan is to use OGV rows with a desirable stagger and camber pattern. Generally, a correctly selected stagger and camber pattern acts by deflecting the flow away from a leading edge of the pylon, thereby reducing the pressure rise in its proximity. However, such arrangements may not effectively accommodate strong variations in flow conditions along the span and may suffer from performance problems if the pylon is very close to the OGV row, on account of the large variations in aerodynamic conditions from one OGV passage to another.

SUMMARY

The present disclosure seeks to provide an OGV arrangement that improves flow uniformity experienced by the fan thereby mitigating the risk of undesirable forcing on the fan blades, whilst improving uniformity of aerodynamic performance around the OGV row. The present disclosure also seeks to provide an OGV arrangement that can accommodate variations in flow conditions along the span of the OGVs.

According to a first aspect there is provided a gas turbine engine comprising: a circumferential row of vanes directly upstream of an asymmetric gas flow path; wherein at a given spanwise position the tangential and axial position of the vanes varies along the row of vanes.

That is, at a given spanwise position the pitch between vanes varies along the row of vanes. Further at a given spanwise position the axial distance of the vanes from a fixed axial position varies along the row of vanes, e.g. measured at a leading edge, a trailing edge and/or a position mid-way between the leading edge and the trailing edge.

One or more of the vanes may be leant such that the tangential and axial position of one or more vanes varies in a spanwise direction.

All of or a majority of the vanes may be leant such that the tangential and axial position of said vanes varies in a spanwise direction.

At a given spanwise position, the axial position of each vane may be different to the axial position of a neighbouring vane. The vanes may define passages, and at a given spanwise position, the circumferential width of each passage may be different to a neighbouring passage.

The axial position of the vanes along the row may be varied by a harmonic function that oscillates finitely. The change in pitch between vanes along the vane row may be defined by a harmonic function that oscillates finitely.

The axial position of the vanes along the row of vanes may be considered to follow a wavy path.

The axial and tangential position of each vane may be differently defined at least at three spanwise positions of the vane. The axial and tangential position of the vanes may vary along the row of vanes at least at three different spanwise positions.

The vanes may be twisted to vary the camber and/or stagger of each vane in a spanwise direction.

Each vane may have a camberline defined at least at one spanwise position by an orthogonal polynomial.

The orthogonal polynomial may be of first order, second order, third order, fourth order or fifth order. Each vane may include different spanwise positions having a camberline defined by polynomials of different amplitudes. The amplitude of the polynomials used to define the camberline may vary along the row of vanes. The polynomials may be Chebyshev polynomials.

The stagger angle and/or camber of each vane of the array of vanes may vary along the row of vanes.

The vanes may be leant and twisted so as to vary the tangential position, the axial position, the stagger, and/or the camber of each vane in a spanwise direction.

Each vane may have a different lean and twist to an adjacent vane.

The asymmetric volume may be defined by an annular gas flow path and a blocking member (or a plurality of blocking members) provided in the annular gas flow path.

The vanes may be outlet guide vanes and the asymmetric volume may be defined by a bypass duct and one or more pylons of the gas turbine engine.

One or more vanes positioned circumferentially to one side of the one of the one or more pylons may be under-cambered compared to vanes positioned circumferentially to the opposite side of said one of the one or more pylons.

One or more vanes positioned circumferentially to one side of the pylon may have a reduced stagger angle compared to vanes positioned circumferentially to the opposite side of the pylon.

In a second aspect there is provided a gas turbine engine comprising: a circumferential row of vanes directly upstream of an asymmetric gas flow path; wherein each of the vanes is leant and twisted so as to have a variation in tangential position, axial position and stagger angle in a spanwise direction of the vane.

The gas turbine engine of the second aspect may have one or more features of the gas turbine engine of the first aspect.

In a third aspect there is provided a gas turbine engine comprising: a circumferential row of vanes directly upstream of an asymmetric gas flow path; wherein at a given spanwise position the axial position of the vanes varies along the row of vanes and is defined by a harmonic function that oscillates finitely.

The gas turbine engine of the third aspect may have one or more features of the gas turbine engine of the first or second aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
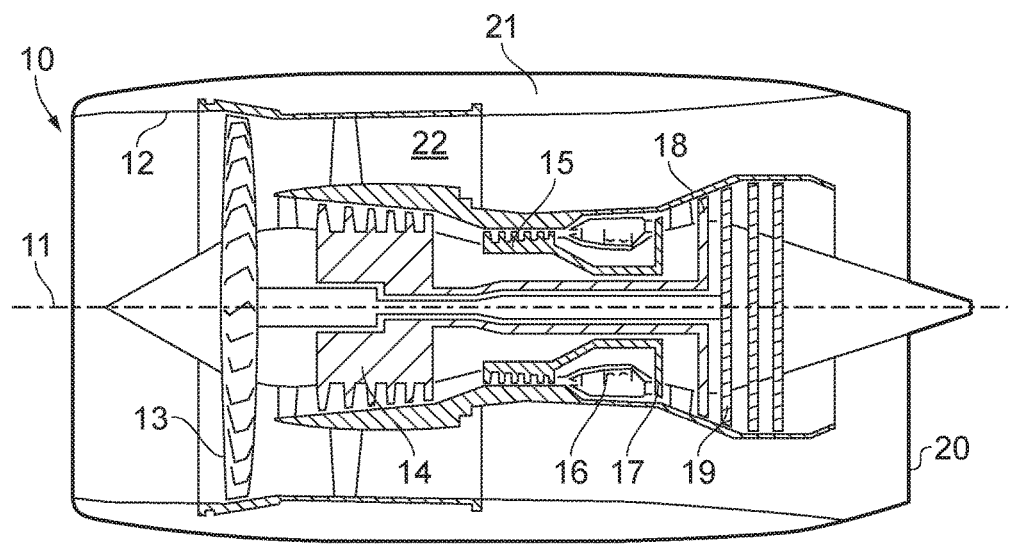
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
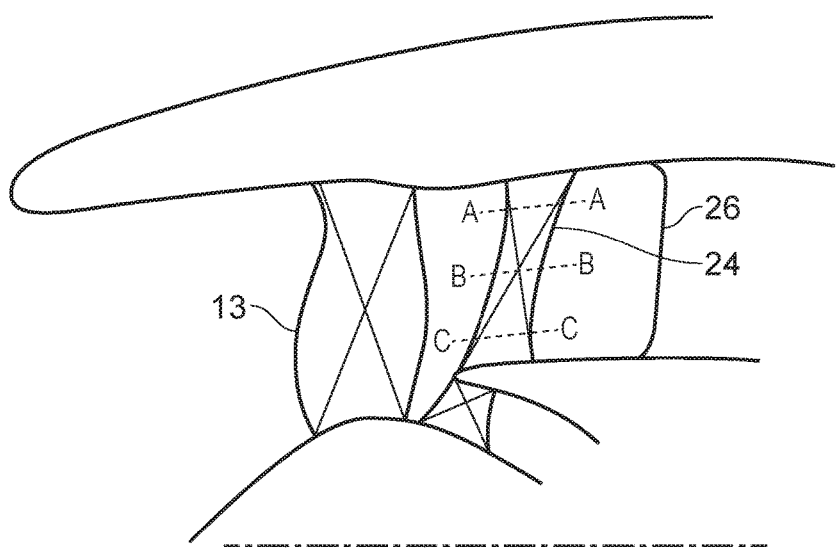
FIG. 2 is a partial sectional view of a schematic of a low pressure compression section of a gas turbine engine.

Referring to FIG. 2, a row of outlet guide vanes (OGVs) 24 is provided downstream of the fan 13 in the bypass duct 22. A bifurcation (or pylon) 26 is provided downstream of the OGVs 24. In the present example a bifurcation is at two diametrically opposed locations, but in alternative embodiments only a single bifurcation may be provided. The bifurcation 26 includes aerodynamically shaped fairings around the pylon structure for the purpose of encasing and directing electrical connections. The bifurcation 26 may encase a radial drive shaft linking a case mounted accessory gearbox and the intermediate pressure compressor 14. The presence of the bifurcation means that the gas flow volume presented to fluid flow from the outlet guide vanes is asymmetric.

Figure 3:
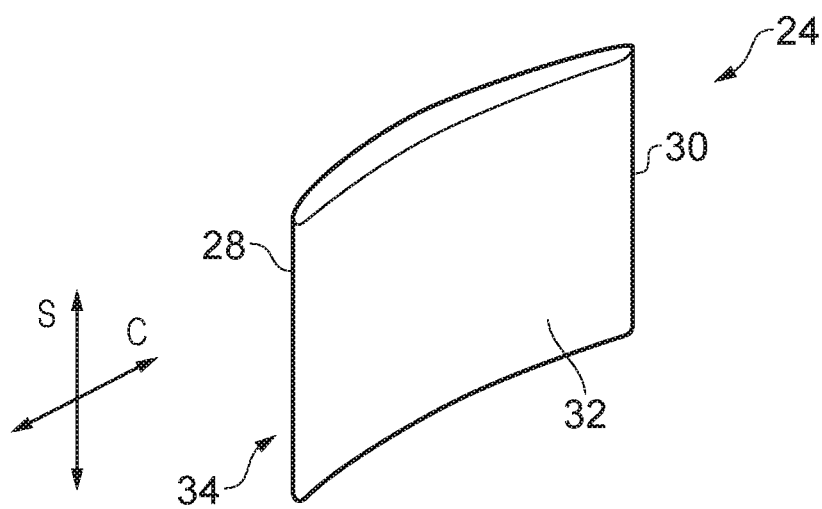
FIG. 3 is a perspective view of an outlet guide vane.

Referring to FIG. 3, each OGV 24 includes an aerofoil portion and has a leading edge 28 and a trailing edge 30. A pressure surface 32 and a suction surface 34 extend between the leading edge and the trailing edge. In the present disclosure, a chordwise direction C refers to a direction extending from the leading edge to the trailing edge, and a spanwise direction S refers to a direction extending from the base to the top of the OGV. Camber refers to the curvature of the aerofoil portion, with a greater camber referring to an increase in curvature. The camberline is mid-way between the suction surface and the pressure surface. The stagger angle is the angle between the axial direction and a chord extending directly from the leading edge to the trailing edge. Tangential position refers to the position of the OGVs with respect to each other circumferentially along the row, and the axial position refers to the position of the OGVs with respect to the axial direction of the gas turbine engine (e.g. the longitudinal direction of the gas turbine engine).

Figure 4:
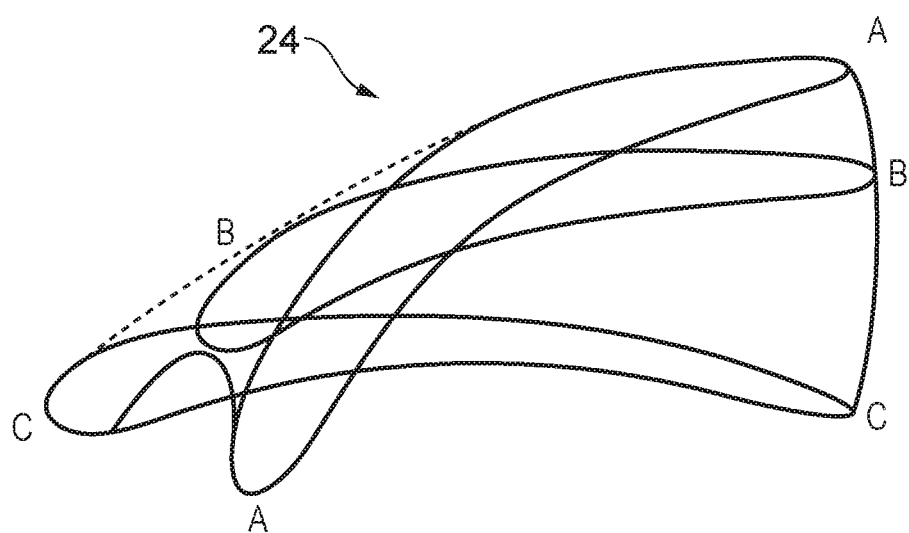
FIG. 4 shows a sectional view of an outlet guide vane at the positions indicated at A, B and C in FIG. 2.

Referring to FIG. 4, each of the OGVs 24 is twisted and leant so as to alter the axial and tangential position of the OGVs, as well as the stagger of the OGVs in the spanwise direction. As will be described later, the twist and lean applied to each OGV is varied along the OGV row so that the axial position, tangential position, and stagger vary along the OGV row as well as in the spanwise direction of each OGV.

Figure 5:
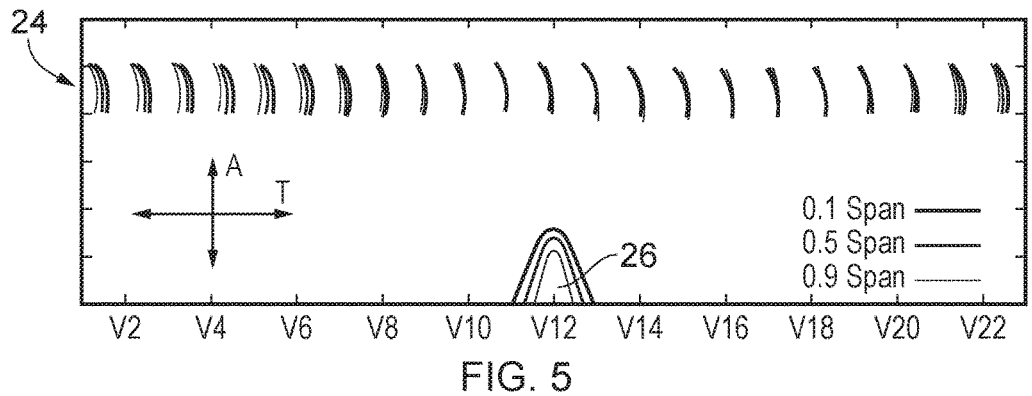
FIG. 5 shows an example of an optimised outlet guide vane arrangement at different spanwise positions.
Figure 6:
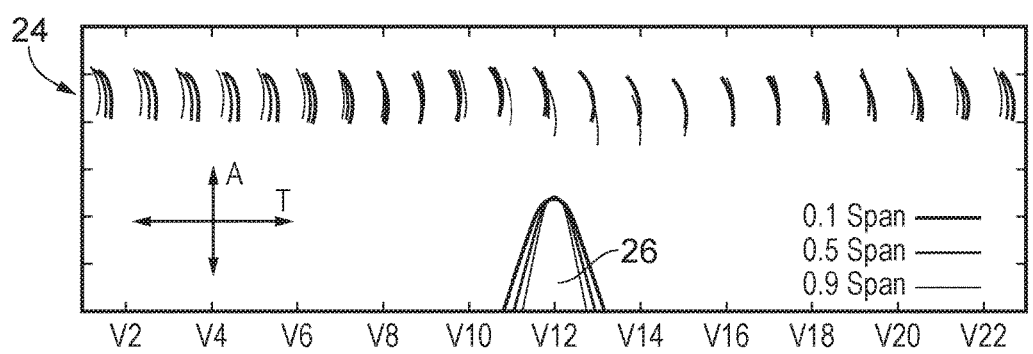
FIG. 6 shows a further example of an optimised outlet guide vane arrangement at different spanwise positions for a bifurcation positioned closer to the outlet guide vanes than in FIG. 5.

Referring now to FIGS. 5 and 6, the variation in axial position (the axial direction being indicated by arrow A) of each OGV 24 along the row of OGVs is illustrated at three spanwise positions. FIGS. 5 and 6 also illustrate how the OGVs can be leant such that the axial position of each OGV is varied in a spanwise direction. FIGS. 5 and 6 show the axial position of each OGV at 0.1, 0.5 and 0.9 of the total span for each OGV. The axial position of each OGV section (a section being considered as the two dimensional vane at a given spanwise position) depends on a number of factors, including where the OGVs are positioned with respect to the bifurcation 26. It can be seen that generally OGVs circumferentially proximal to the bifurcation are positioned more downstream than the OGVs circumferentially distal to the bifurcation.

In the present application, upstream and downstream refer to the generally axial flow of air through the gas turbine engine (indicated at 10 in FIG. 1).

Figure 7:
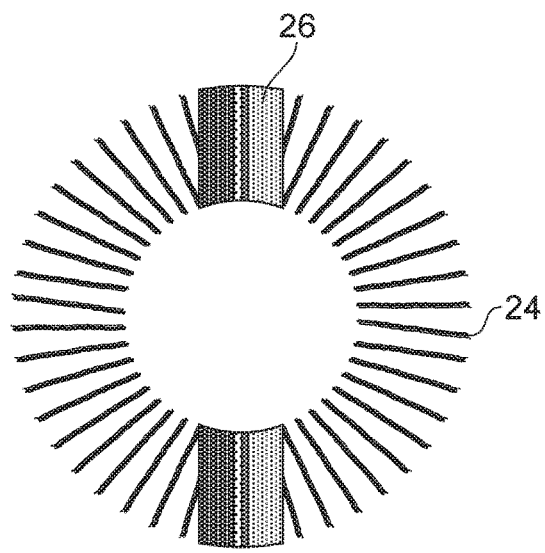
FIG. 7 shows a view down the axis of the engine of the optimised outlet guide vanes as seen from the bifurcation side of the outlet guide vanes (i.e. from the exit)
Figure 8A:
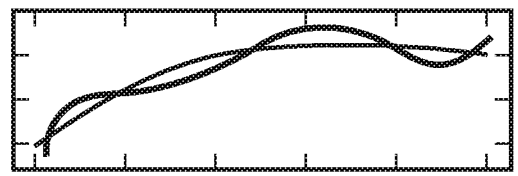
FIG. 8A to 8E are examples of modifications to camberline of an outlet guide vane using Chebyshev polynomials of the fifth to first order respectively, the light grey line indicates the nominal camberline and the black line indicates the modified camberline.
Figure 8B:
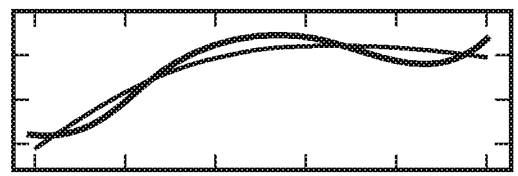
Figure 8C:
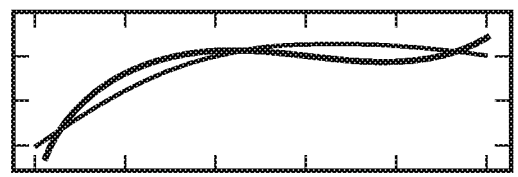
Figure 8D:
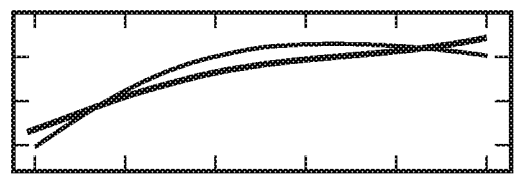
Figure 8E:
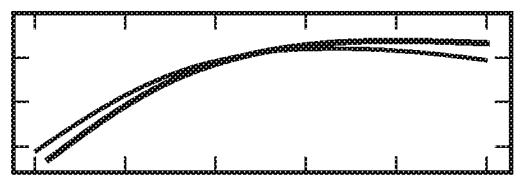

As previously discussed, as well as the axial position of the OGVs 24 being varied, the tangential position (the tangential direction is indicated by arrow T) of the OGVs is also varied along the row of OGVs, and in a spanwise direction of each OGV. The variation in tangential position means that the pitch between the OGVs varies along the row of OGVs and also varies depending on the radial (or spanwise) position of the OGV row. FIG. 7 further illustrates the variation in tangential position of the OGVs along the OGV row and in a spanwise direction of the OGVs.

As will be described later with reference to the method of designing the described OGV row, the variation in axial position and pitch between vanes (i.e. tangential position of the vanes) is based on a harmonic function (e.g. a harmonic function that oscillates finitely).

The degree of variation in axial position and tangential position along the OGV row and in the spanwise direction of each OGV row depends on a given engine architecture. For example, it can be seen that the distribution of OGVs is different in FIG. 5 to that in FIG. 6 and this difference takes into account that the bifurcation is positioned nearer the OGVs in FIG. 6 than in FIG. 5.

As previously discussed, the OGVs 24 are twisted so as to vary the stagger of the OGV in a spanwise direction. The degree of twisting applied to each OGV is varied along the OGV row so as to vary the stagger both in a spanwise direction and along the OGV row. The degree of variation in stagger angle will depend on a given application. The vanes in FIGS. 9 and 10 are numbered from V1 to V22. Vanes V2 to V11 are to the left hand side of the bifurcation (when viewed from the bifurcation towards the OGVs), and vanes V13 to V22 are to the right of the bifurcation (when viewed from the bifurcation towards the OGVs). Generally vanes V2 to V11 will have an increased camber and reduced stagger angle compared to vanes V13 to V22. Reference to left and right assumes that, when viewed from the front of the engine, the fan is rotating anti-clockwise.

In the present example forty four vanes are provided. The bifurcation diametrically opposite the bifurcation shown in FIG. 2 has different geometry and dimensions to the bifurcation shown in FIG. 2, and as such the described design process is repeated for the other half of the vanes (i.e. in this example the remaining 22 vanes) proximal to the other bifurcation. It is understood by the person skilled in the art that the number of OGVs provided will depend upon a given engine design.

As will be described later with reference to the method of designing the OGV row, the camberline of each OGV is based on one or more orthogonal polynomial functions. The amplitude of the one or more polynomial functions (e.g. orthogonal polynomials of a first order, second order, third order, fourth order, and/or fifth order) may be varied along the OGV row and/or may vary in a spanwise direction of the OGV.

When designing the vane, the axial position, tangential position, stagger angle, and camber of each OGV is defined at a number of positions of the OGV in a spanwise direction. The vanes are optimised in three-dimensions to control the spanwise variation of the aerofoil modifications and guarantee a smooth gas-washed surface.

It has been found that the above described arrangement of OGVs 24 provides a more uniform loading across the row of OGVs taking into account the bifurcation 26 than OGV arrangements of the prior art.

A method of designing the described OGVs will now be described. The first step in the design process is to provide a nominal OGV row geometry. The geometry of the nominal OGV row is uniform along the row and the nominal OGV design is optimised neglecting the presence of the pylon using standard procedures of aerodynamic design. The next step in the method is to optimise the OGV geometry in two dimensions. The optimisation is done by modelling streamtubes located at different radial heights in the bypass. The OGVs can be considered to be optimised at multiple spanwise locations corresponding to the position of these stream tubes.

The OGV arrangement is optimised by modifying the camberline, stagger angle and axial and tangential position of each vane. Firstly, modification of the camber and stagger will be described. The camberline of an aerofoil, such as an OGV, extends from the leading edge to the trailing edge and is mid-way between the pressure surface (indicated at 32 in FIG. 3) and the suction surface (indicated at 34 in FIG. 3). The camber and stagger of the OGVs are modified by modifying the camberline. The camberline is modified using orthogonal polynomials. In the present example Chebychev polynomials are used, but in alternative embodiments any suitable polynomial may be used. Chebychev polynomials are used because they represent a complete (all motions can be represented) and optimal (a given motion can be approximated within a given accuracy with the smallest number of coefficients) basis. This is advantageous because it means that the two dimensional optimised OGVs are not artificially constrained by the choice of degree of freedom. Furthermore, because polynomials are infinitely differentiable, no discontinuities are introduced in the aerofoils surface curvature.

The polynomials used to optimise the OGV camberline may be of any order. In the present example, the highest order used is a fifth order polynomial. Each OGV may be modified by polynomials of the same order. However, the amplitude of the polynomials may vary between different spanwise positions. Referring to FIGS. 8A to 8E, it can be seen that the first order polynomial applies stagger modification to the OGV about the camberline centre point, and the higher degree polynomials re-camber the vane. Higher degree polynomials apply more aggressive modifications to the camberline.

Now considering the modification to the axial and tangential position of the OGVs at a given spanwise position, the OGVs can be moved by rigid body motions in the meridional and tangential directions. It has been found that translation in the meridional and tangential direction can modify the axial velocity density ratio (AVDR) without modifying the shape of the aerofoil. This means that passages between the OGVs can be opened or closed using smaller variations in camber than conventionally used.

Figures 9A, 9B:
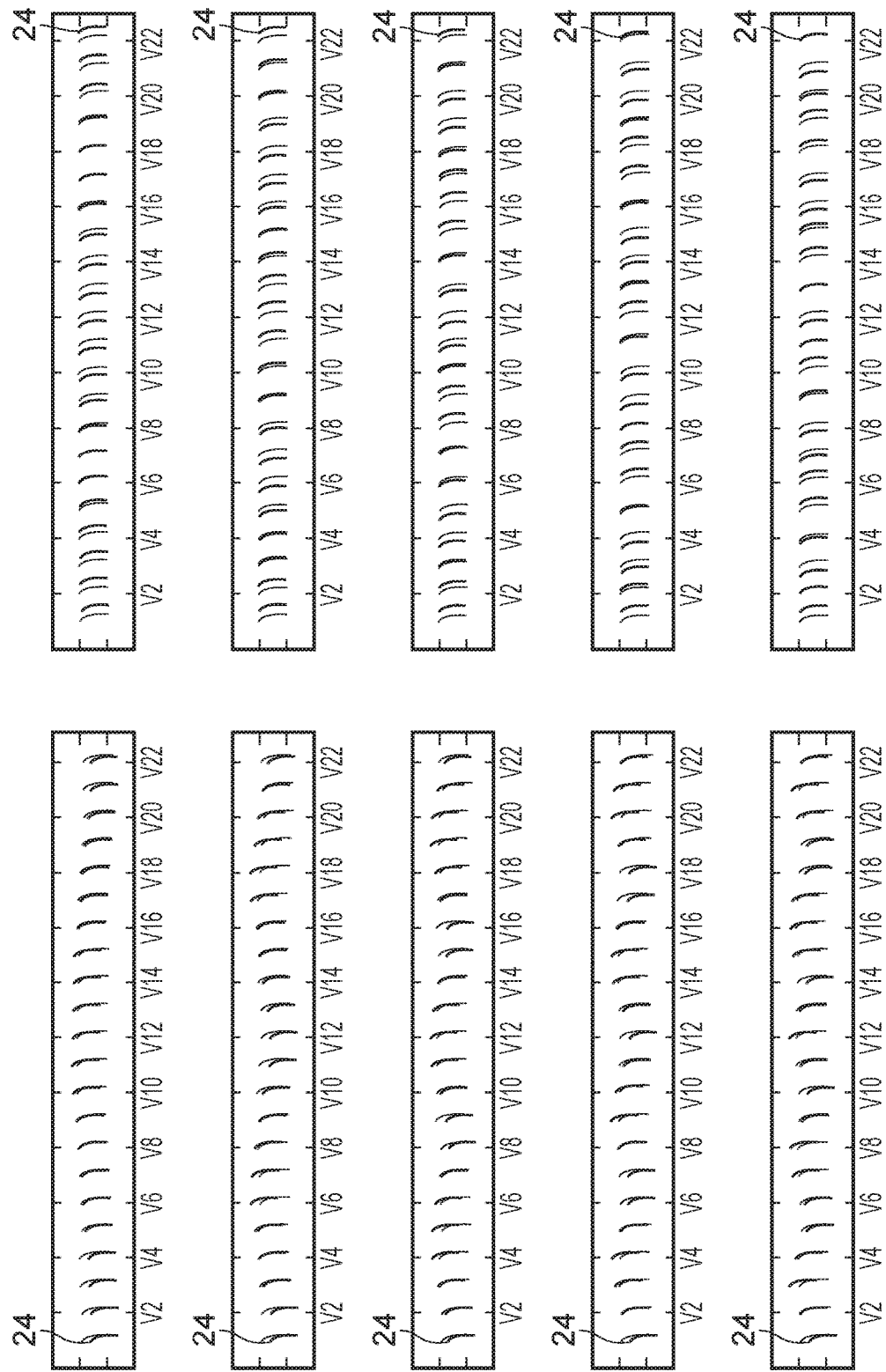
FIG. 9A shows an example of axial translation of outlet guide vanes according to five patterns corresponding to Fourier indices 1, 2, 3, 4, 5, the lighter vanes indicate the undisplaced position, and the darker vanes indicate the displaced positions.
FIG. 9B shows an example of tangential translation of outlet guide vanes, the lighter vanes indicate the undisplaced position, and the darker vanes indicate the displaced positions.
Figure 10C:
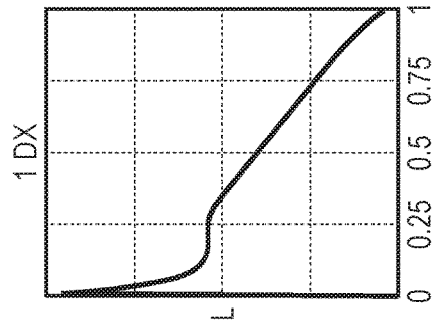
FIGS. 10B to 10F show load variation on the outlet guide vane along a passage defined by the outlet guide vane for vanes that have been optimised according the method disclosed in the present application, each graph contains as many curves as individual vanes, but there appears to be only a single curve because they are all identical, each graph corresponds to a different position of the outlet guide vane row with respect to the bifurcation, with the vanes being spaced further from the bifurcation in FIG. 6B than in FIG. 6F.
Figure 10F:
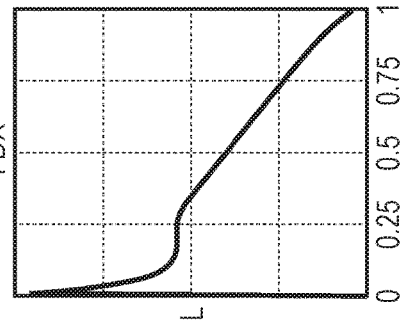
Figure 10B:
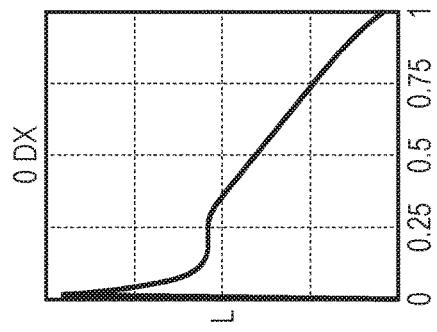
Figure 10E:
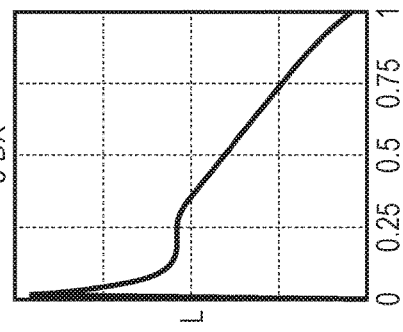
Figure 10A:
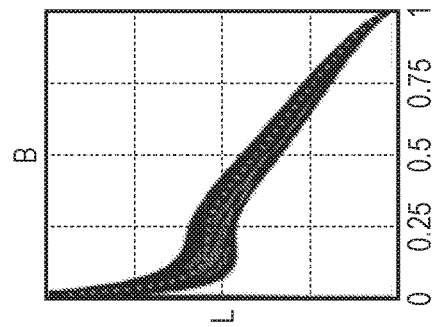
FIG. 10A shows load variations (L) on the outlet guide vanes along a passage defined by the outlet guide vane, the different curves refer to individual vanes in a row of identical vanes facing a pylon.
Figure 10D:
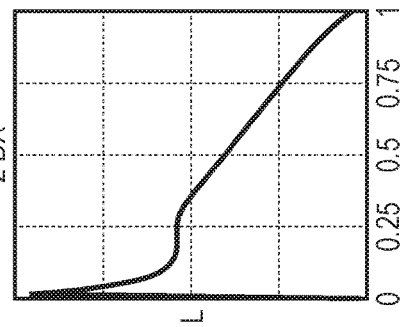

Referring to FIGS. 9A and 9B, modifying the position of the OGVs in the meridional and tangential direction modifies the axial and tangential position of the OGVs such that the pitch and axial location of the OGVs varies around the annulus. The position of each OGV 24 (only one labelled for clarity) along the array is defined by moving the OGVs according to a number of circumferential harmonics. FIGS. 9A and 9B illustrate the solid body motion applied using each of the first five Fourier coefficients in the axial and tangential directions. Each OGV is designated a label from V1 to V22, and this labelling is consistently applied throughout the present application.

The specific harmonics selected will depend upon the gas turbine engine design. The values of the coefficients multiplying the Chebychev polynomials to represent modifications to individual vanes, as well as the Fourier coefficients used to represent the motion of the row of OGVs are determined by solving a linear least-square system. The system is formulated in such a way that the solution minimises the sum of the squares of the residuals. The residuals are the values of functions representing a number of conditions imposed on the flow. For example, the compliance of the shape of the lift distribution of each aerofoil to the nominal lift distribution; a number of harmonics of the pressure (or velocity) distribution upstream of the row of OGVs vanishes or matches a target distribution; and no mean residual swirl is present downstream of the bifurcation.

The OGV geometry is optimised in two dimensions so as to optimise the vane to vane loading variation, the upstream velocity distortion, and the pylon circulation. Referring to FIGS. 10B to 10F, it can be seen that the load variation around the annulus is significantly reduced for the five examples shown compared to the baseline design (labelled B and shown in FIG. 10A). The baseline design is the uniform arrangement of OGVs provided at the start of the design procedure. In each example shown the birfurcation is positioned at a different axial distance downstream of the OGVs. As can be seen in FIGS. 10B to 10F, the described design procedure can produce optimal OGV rows for pylons positioned close to the OGV.

Once the two dimensional optimisation is complete, three dimensional vanes are built by stacking the two dimensional sections of each vane. The three dimensional geometry can then be optimised using a similar approach. In three dimensions, however, the sections are not optimised independently. The radial variation of the motions represented by the axial and tangential directions as well as stagger and camber of the sections are instead determined as solutions of a least square problem formulated in three dimensions. Hankel transforms are used to obtain a smooth variation along the span of each OGV.

The OGV rows designed as a result of using the described procedure include twist and bow patterns instead of using the more conventional stagger patterns.

Once the OGV row has been designed, the gas turbine engine can be manufactured by positioning the OGVs with a camberline, lean and twist as defined by the design process so as to achieve the optimal axial position, tangential position, stagger angle, and camber in a spanwise direction of each OGV and along the OGV row.

Figure 11:
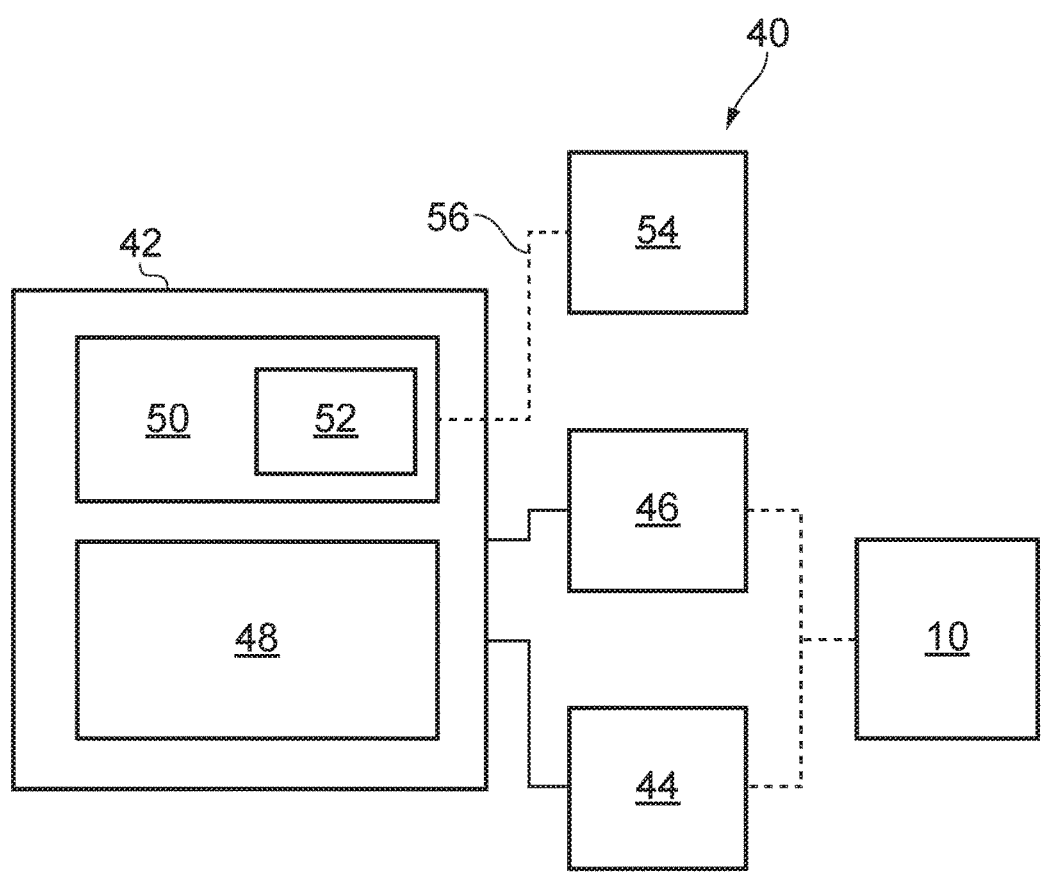
FIG. 11 shows an example of an apparatus used to implement the design method disclosed in the present application.

Referring to FIG. 11, the method of design may be implemented using an apparatus 40 for designing an OGV row according to the described examples. The apparatus 40 includes a controller 42, an input device 44, and an output device 46. In some examples, the apparatus 40 may be a single, unitary device where the controller 42, the input device 44, the output device 46 are physically coupled together. In other examples, the apparatus 40 may be an apparatus that is distributed across a plurality of different locations (for example, the apparatus 40 may be distributed across different cities, different counties or different countries).

In some examples, the apparatus 40 may be a module. As used herein, the wording 'module' refers to a device or apparatus where one or more features are included at a later time, and possibly, by another manufacturer or by an end user. For example, where the apparatus 40 is a module, the apparatus 40 may only include the controller 42, and the remaining features may be added by another manufacturer, or by an end user.

The controller 42 may comprise any suitable circuitry to cause performance of at least part of the methods described herein. The controller 42 may comprise any of, or combination of: application specific integrated circuits (ASIC); field programmable gate arrays (FPGA); single or multiprocessor architectures; sequential (Von Neumann)/parallel architectures; programmable logic controllers (PLCs); microprocessors; and microcontrollers, to perform the methods.

By way of an example, the controller 42 may comprise at least one processor 48 and at least one memory 50. The memory 50 stores a computer program 52 comprising computer readable instructions that, when read by the processor 48, causes performance of at least part of the methods described herein. The computer program 52 may be software or firmware, or may be a combination of software and firmware.

The processor 48 may be located at a single location or may be distributed between the two or more remote locations. The processor 48 may include at least one microprocessor and may comprise a single core processor, or may comprise multiple processor cores (such as a dual core processor or a quad core processor).

The memory 50 may be located at a single location or may be distributed between two or more locations. The memory 50 may be any suitable non-transitory computer readable storage medium, data storage device or devices, and may comprise a hard disk and/or solid state memory (such as flash memory). The memory 40 may be permanent non-removable memory, or may be removable memory (such as a universal serial bus (USB) flash drive).

The computer program 52 may be stored on a non-transitory computer readable storage medium 54. The computer program 52 may be transferred from the non-transitory computer readable storage medium 54 to the memory 50. The non-transitory computer readable storage medium 54 may be, for example, a USB flash drive, a compact disc (CD), a digital versatile disc (DVD) or a Blu-ray disc. In some examples, the computer program 52 may be transferred to the memory 50 via a wireless signal 56 or via a wired signal 56.

The input device 44 may be a user input device. For example, the input device may comprise one or more of, or any combination of: a keyboard, a keypad, a touchscreen display, a computer mouse, and a touchpad.

The output device 46 may be any suitable device for presenting information to a user of the apparatus 40. The output device 46 may comprise a display (such as a liquid crystal display (LCD), a light emitting diode (LED) display, or a thin film transistor (TFT) display for example).

The described method of design provides an OGV row arrangement with improved uniform performance compared to conventional OGV row arrangements.

The following factors contribute to the improved uniform performance of the described OGVs:
1) the use of a set of complete basis functions (Hankel-Chebychev) which do not introduce arbitrary limitations in the vane motion;
2) the use of circumferential and axial displacements to control the load at each section;
3) the use of orthogonal polynomials to modify the camberline to control the load at each section; and
4) the use of a three-dimensional approach which accounts for variations in passage width along the span.

The described OGV row contains patterns in aerofoil shape as well as vane bow and lean which can produce a target distortion downstream of the fan, e.g. mask the distortion induced by the pylon, whilst guaranteeing uniform performance of the OGV row.

The described examples relate to the arrangement of the OGVs where a bifurcation is provided downstream of the OGVs. However, the arrangement of vanes and/or the method of design and manufacture described is applicable to any vane arrangement of a gas turbine engine that is followed by an asymmetric volume.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising:
a circumferential row of vanes directly upstream of an asymmetric gas flow path;
wherein at a given spanwise position a tangential and axial position of the vanes varies along the circumferential row of vanes, and
wherein each vane of the circumferential row of vanes is leant such that the tangential and axial position of each respective vane varies in a spanwise direction within a span of the vane.

2. The gas turbine engine according to claim 1, wherein the tangential position is varied such that a pitch between vanes is defined along the circumferential row of vanes using a harmonic function that oscillates finitely.

3. The gas turbine engine according to claim 1, wherein the axial position of each vane is defined along the circumferential row of vanes using a harmonic function that oscillates finitely.

4. The gas turbine engine according to claim 1, wherein the vanes are twisted to vary the stagger of each vane in a spanwise direction.

5. The gas turbine engine according to claim 1, wherein each vane has a camberline defined at least at one spanwise position by an orthogonal polynomial.

6. The gas turbine engine according to claim 1, wherein the stagger angle and/or camber of each vane of the circumferential row of vanes varies along the circumferential row of vanes.

7. The gas turbine engine according to claim 1, wherein the vanes are leant and twisted so as to vary the tangential position, the axial position, the stagger, and/or the camber of each vane in a spanwise direction.

8. The gas turbine engine according to claim 1, wherein the vanes are outlet guide vanes and the asymmetric gas flow path is defined by a bypass duct and at least one pylon of the gas turbine engine.

9. The gas turbine engine according to claim 8, wherein one or more vanes of the circumferential row of vanes positioned circumferentially to one side of the pylon are under-cambered compared to vanes positioned circumferentially to the opposite side of the pylon.

10. The gas turbine engine according to claim 8, wherein one or more vanes of the circumferential row of vanes positioned circumferentially to one side of the pylon have a reduced stagger angle compared to vanes positioned circumferentially to the opposite side of the pylon.

11. A gas turbine engine comprising:
a circumferential row of vanes directly upstream of an asymmetric gas flow path;
wherein each of the vanes is leant and twisted so as to have a variation in tangential position, axial position, and stagger angle in a spanwise direction within a span of each respective vane.

12. The gas turbine engine according to claim 1, wherein the tangential position is varied such that a pitch between vanes is defined along the circumferential row of vanes using a harmonic function that oscillates finitely.

13. The gas turbine engine according to claim 1, wherein the axial position is defined along the circumferential row of vanes using a harmonic function that oscillates finitely.

* * * * *